United States Patent

[11] 3,587,827

| [72] | Inventor | Gerald L. Schoen<br>Kaukauna, Wis. |
|---|---|---|
| [21] | Appl. No. | 794,538 |
| [22] | Filed | Jan. 28, 1969 |
| [45] | Patented | June 28, 1971 |
| [73] | Assignee | Badger Northland Inc.<br>Kaukauna, Wis. |

[54] MATERIAL DISTRIBUTOR
7 Claims, 5 Drawing Figs.

[52] U.S. Cl................................................. 198/106,
105/241, 105/242, 119/52, 119/56, 198/218
[51] Int. Cl....................................................... A01k 5/00,
B65g 25/04
[50] Field of Search............................................ 198/1, 218,
106; 214/58, 59, 60, 63; 105/240—242, 290;
119/52, 56

[56] References Cited
UNITED STATES PATENTS

| 1,213,327 | 1/1917 | Baker | 214/63 |
| 1,607,035 | 11/1926 | Andrews | 214/63 |
| 3,217,693 | 11/1965 | Loesch et al. | 119/56 |
| 3,252,444 | 5/1966 | Haen | 119/56X |
| 3,391,653 | 7/1968 | DeRidder | 105/240 |

*Primary Examiner*—Robert G. Sheridan
*Attorney*—Gerhardt, Greenlee & Farris

ABSTRACT: A livestock feeding arrangement with a feed bunk, a pair of rails mounted above the feed bunk and a carriage mounted on the rails for horizontal reciprocating movement above the feed bunk. A plurality of trays are pivotally mounted on the carriage to form a channel that is filled with feed as the carriage passes under a conveyor. When the carriage reaches a preselected position on the rails, all the trays are simultaneously pivoted to unload the feed carried by the trays and the direction of movement of the carriage is reversed.

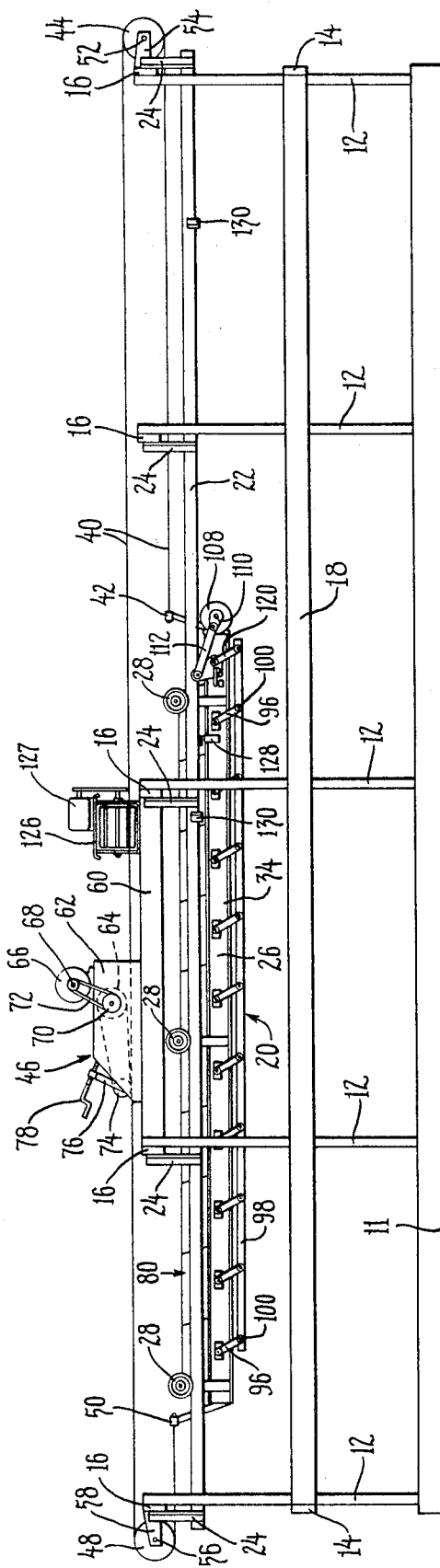
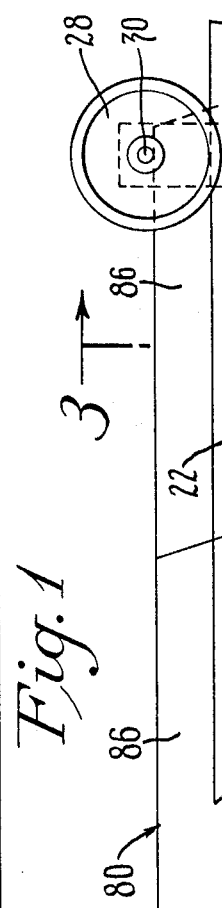
Fig. 1
Fig. 2
INVENTOR.
GERALD L. SCHOEN
BY Tweedale & Gerhardt
ATTORNEYS.

INVENTOR.
GERALD L. SCHOEN
BY
Tweedale & Gerhardt
ATTORNEYS.

MATERIAL DISTRIBUTOR

This invention relates to material distributors and more particularly to livestock feeders for distributing livestock feed in feed bunks.

Substantial improvements have recently been made in material distributors for livestock feed distribution. These improved material distributors include tray-type distributors and self-propelled distributors. The tray-type distributors have a plurality of trays pivotally mounted on a pair of endless chains which extend the length of the area over which material is distributed. The trays on the lower run of the endless chains are spaced to form one continuous tray which receives material as the individual trays pass a material delivery point. In one version of the tray-type distributor, the trailing end of each filled tray rides across the top of the livestock feed which has built up in the feed bunk. As each tray reaches the point along the feed bunk, where there is not sufficient feed to hold the trailing end of the tray up, the tray pivots about its mounting points on the chains and deposits its load of material on the feed bunk. In another version of the tray-type material distributors, the trailing end of each tray is held up by a latch mechanism. The amount of livestock feed distributed to each part of the feed bunk is controlled by controlling the movement of a divertor which trips the latch mechanisms on the trays.

The recently developed self-propelled distributors have a carriage, approximately one-half the length of the area over which livestock feed is to be distributed, mounted on rails above a feed bunk. A conveyor, with two endless chains extending the length of the carriage and a plurality of flights connected to the two chains for conveying material, is mounted on the carriage. As the carriage is reciprocated back and forth along the rails, livestock feed is continuously deposited on the moving carriage and conveyed to the feed bunk by the conveyor.

The material distributor of this invention combines the advantages of the tray-type distributors and the self-propelled feed distributor by providing trays to transport the material with minimum separation of fibrous material and grain mixtures, and by using a movable carriage to minimize the length of the material distributor and the number of trays needed for a feed bunk of a given length. The carriage is supported on at least one rail above a feed bunk. A power source is provided to reciprocate the carriage back and forth along the rail. The trays for receiving and holding material are pivotally mounted on the carriage on axes perpendicular to the direction of movement of the carriage along the rail. When the carriage is moved to a preselected location along the rail, a mechanism is actuated which pivots the trays and unloads any material which is on the trays onto the feed bunk. The direction of movement of the carriage is then reversed and the trays are pivoted back into a position to receive more material.

In order that the invention may be more fully understood, an embodiment will now be described with reference to the accompanying drawings in which:

FIG. 1 is a side view of the material distributing arrangement of this invention.

FIG. 2 is a fragmentary side view of a portion of the material distributor showing the tray pivoting means and the trays in their trough forming position.

Figure 3:
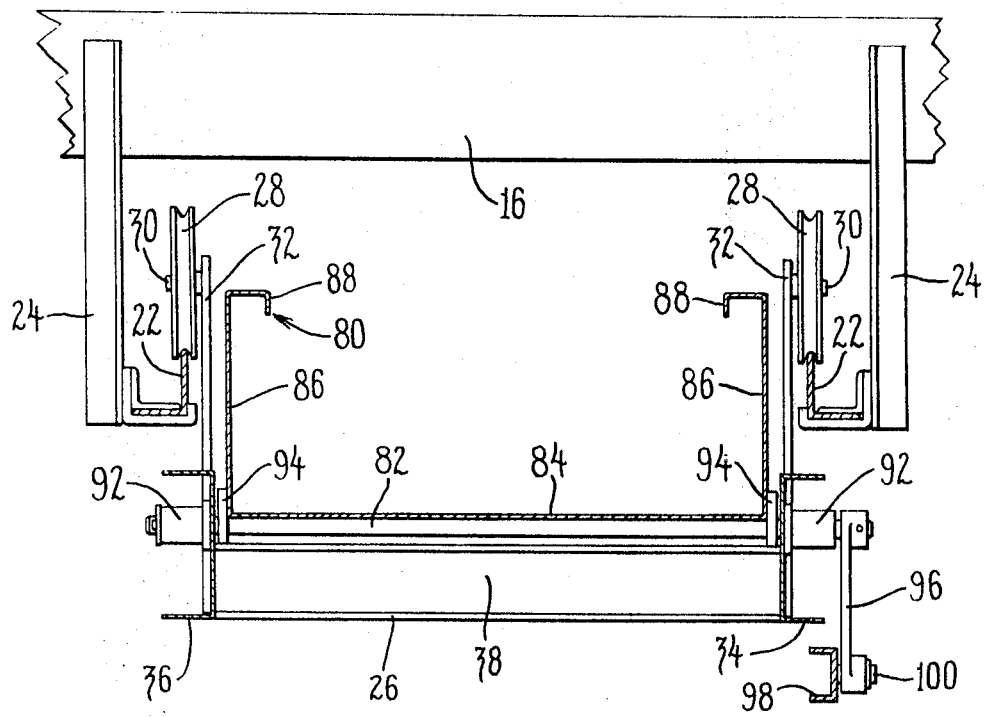
FIG. 3 is a sectional view taken along lines 3–3 of FIG. 2.

There is shown in FIG. 1 a livestock feeding arrangement using the material distributor of this invention. The system has one or more feed bunks 10 with sides 11. Uprights 12 are fastened to each of the sides 11 of the feed bunk. Lower cross braces 14 and upper cross braces 16 extend between uprights 12 on opposite sides of the feed bunk 10. Horizontal members 18 extend the length of the feed bunk on each side a sufficient distant above the sides 11 that livestock can eat from the bunk. These horizontal members brace the uprights 12 and keeps livestock from climbing into the bunk. A feed distributor 20 is carried above the feed bunk on horizontal rails 22. The rails 22 are supported by hangers 24 which are attached to the upper cross braces 16.

The feed distributor 20 includes a carriage 26 movably supported on the rails 22 by rollers 28. The rollers 28 are rotatably attached by pins 30 to the upper end of the plate members 32. The plate members 32 are rigidly attached to the carriage 26. The carriage 26 has a frame with long channel members 34 and 36, and crossmembers 38. The length of the carriage 26 can be easily varied for use with feed bunks of various lengths by changing the length of the channel members 34 and 36.

The feed distributor 20 is propelled along the rails 22 by a cable 40. The cable 40 extends from a bracket 42 on one end of the carriage 26 around a pulley 44 on one end of the feed bunk, to a drive 46, around a pulley 48 on the other end of the feed bunk, and back to a second bracket 50 on the other end of the carriage 26. The pulley 44 is rotatably supported, on a shaft 52, by brackets 54 which are attached to an upper cross brace 16 at one end of the feed bunk. The pulley 48 is supported at the other end of the feed bunk, in the same manner as the first pulley 44, by a shaft 56 and brackets 58. The rails 22 could be mounted upon tracks (not shown) which would carry the rails in a direction perpendicular to the feed bunks so that one feed distributor could serve more than one feed bunk. In this type arrangement, the pulleys 44 and 48 would have to be connected to the end of rails 22. If a feed area were used in place of feed bunks, feed could be distributed any place under the rails and the track by the feed distributor.

The drive 46 for the cable 40 is mounted above the rails 22 on supports 60. The drive has frame members 62, a drum 64 rotatably supported between the frame members 62, and a reversible motor 66 mounted on top of the frame members to drive the drum 64 through the pulleys 68 and 70 and belt 72. A second drum 74 is rotatably supported on the brackets 76 between the frame members. The cable 40 is wrapped around the drums 64 and 74 as shown by the broken line in FIG. 1. Friction between the drum 64 and the cable causes the carriage 26 to move when the reversible motor 66 runs. The tension in the cable 40 is adjusted by turning a screw 78 to change the distance between the drums 64 and 74.

Figure 4:
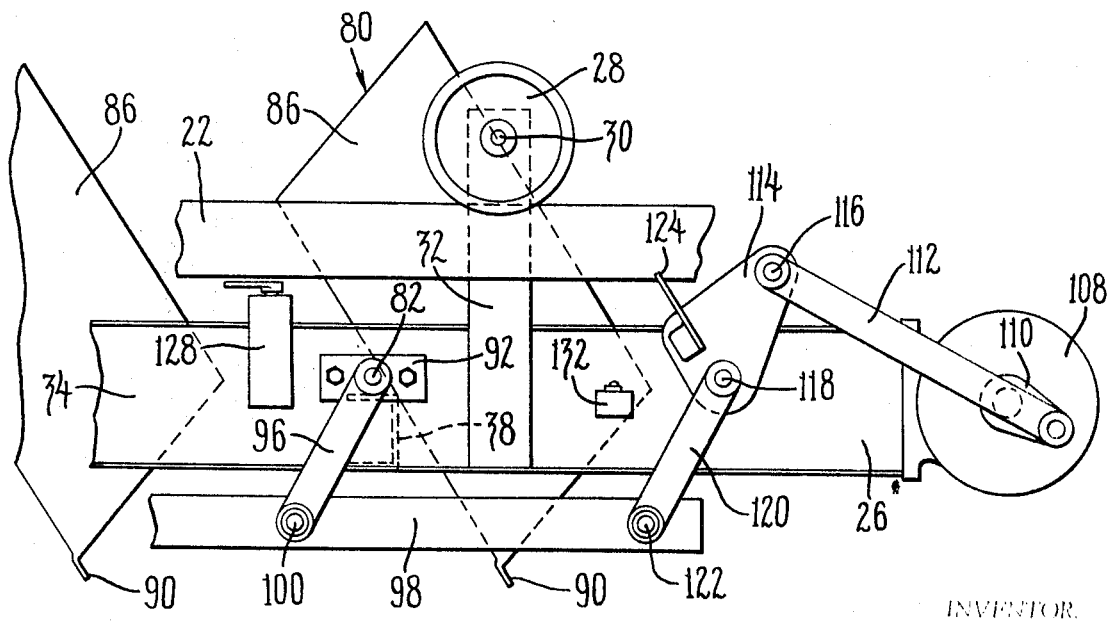
FIG. 4 is a fragmentary side view of a portion of the carriage showing the tray pivoting means and the trays in their unloading position.

A series of trays 80 are pivotally connected to the carriage 26 on shafts 82. Each tray has a bottom 84, sides 86, a flange 88 at the top of each side, and a lip 90 on one end of each bottom 84. The shafts 82 pass through holes in the channels 34 and 36 and through bearings 92 attached to each channel. A spacer 94 is on each end of the shafts 82 between the channels 34 and 36 and the sides 86 of the trays 80. One of the trays 80 is attached to each of the shafts 82. When the trays 80 are positioned to be loaded as shown in FIG. 2, the bottom of each tray overlaps the lip 90 of the tray to its left. The lip prevents leakage of fine material. The sides 86 of each tray abut the sides of the adjoining trays to form a trough running substantially the length of the carriage. A lever 96 is attached to one end of each of the shafts 82 which extend from the side of the carriage. The other end of each lever 96 is pivotally attached to an arm 98 by a pin 100. The arm 98 is moved back and forth a distance sufficient to rotate the shafts 82 approximately 60° to unload the trays 80 as shown in FIG. 4. The trays 80 can be constructed from a noncorrosive or corrosive resistant substance so that corrosive materials like fertilizer can be handled by the distributor. Also the length of the trays used can be such that a separate pile of feed is deposited for each animal.

Figure 5:
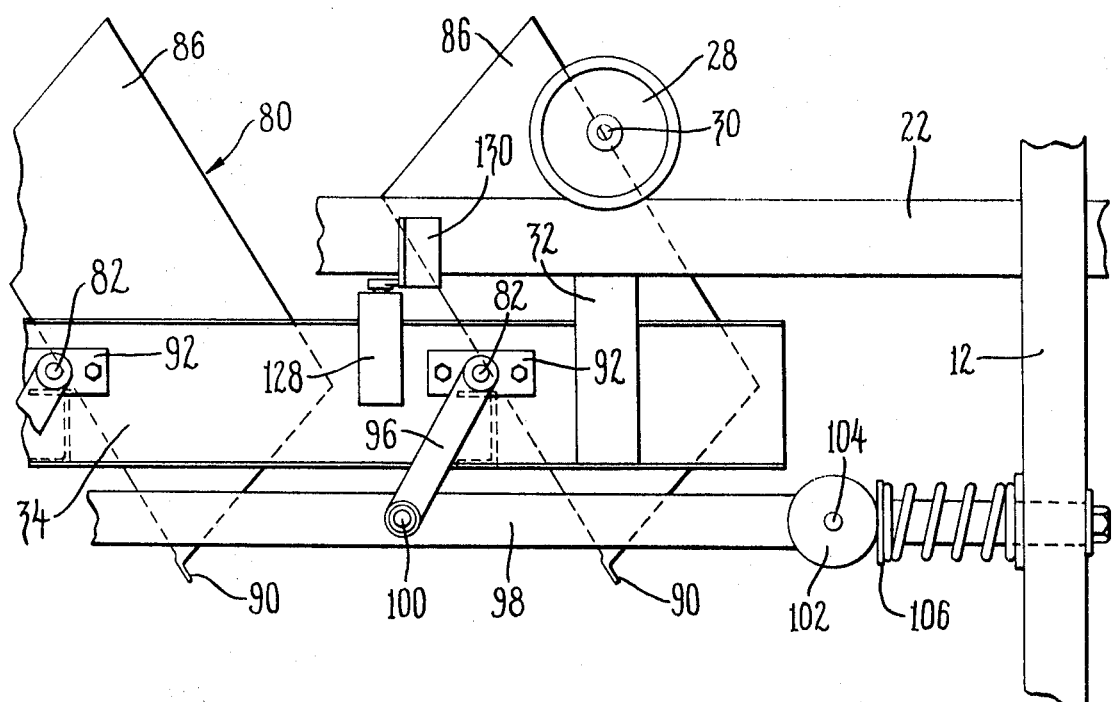
FIG. 5 is a fragmentary side view of a portion of the carriage showing an alternate arrangement for pivoting the trays.

The arm 98 may be driven to unload the trays 80 in a number of ways. As is shown in FIG. 5, the end of the arm 98 may be provided with a roller 102 attached by a pin 104. When the carriage is moved to the right, the roller 102 contacts a spring stop 106 attached to the uprights 12 at one end of the feed bunk. As the carriage continues to move, the spring stop 106 holds the arm 98 causing the shafts 82 to rotate and unload the trays. With this system, an arm (not shown) similar to the arm 98 would have to be located above the shafts 82 and connected to extensions of the levers 96, to rotate the shafts 82 in a clockwise direction as seen in FIG. 5, when the carriage is moved to the left end of the feed bunk.

The arm 98 may also be driven by a gear head motor 108 attached to one end of the carriage as shown in FIGS. 1, 2 and 4 to unload the trays 80. The gear head motor 108 turns a crankshaft 110. The crankshaft 110 reciprocates a connecting rod 112 and the connecting rod 112 rotates a plate 114 to which it is pivotally connected by a pin 116. When the crankshaft on the gear head motor 108 rotates 180°, the plate 114 rotates its supporting shaft 118 approximately 60° clockwise. The lever 120 which is fixed to the disc is in turn rotated with the shaft 118 and displaces the arm 98 to which it is attached by a pin 122. The levers 96, which are identical to lever 120 are also displaced as shown in FIG. 4 so that the shafts 82 will also be rotated 60° to unload the trays 80. A tray 80 could be connected to the shaft 118 also. The gear head motor 108 continues to run until it has rotated the crankshaft 110 a total of 360° and the plate 114 has been rotated 60° counterclockwise. The contact 124 on the plate 114 then actuates a microswitch 132 to stop the gear head motor with the trays in their trough forming position. The control circuits which are not shown are conventional and would be obvious to one skilled in the art.

The conveyor 126 driven by a motor 127 supplies feed continuously to the trays 80 on the carriage 26 when the feed distributor is in operation. The carriage is moved by the drive 46 along the rails 22 toward one end of the feed bunk until a microswitch 128 on the carriage contacts a stop 130 on one of the rails 22. The microswitch stops the reversible motor 66 which moves the carriage and can start a gear head motor 108. The gear head motor 108 rotates the crankshaft 110 180° to unload the trays 80 and then another 180° to return the trays to the position in which they form a trough. When the trays have been returned a contact 124 contacts a microswitch 132 to stop the gear head motor 108 and start the reversible motor 66 in the opposite direction to move the carriage toward the other end of the feed bunk. As the carriage moves toward the other end of the feed bunk, feed is again deposited on the trays by the conveyor 126. When the carriage reaches the other end of the feed bunk, the microswitch 128 contacts another stop 130 stopping the carriage and starting the gear head motor 108 to dump the trays. This cycle is continued until the system is turned off.

It should be understood that it is not intended to limit the invention to the above-described forms and details and the invention includes such other forms and modifications as are embraced by the scope of the following claims:

I claim:

1. A distributing device for distributing material comprising: a moveable carriage, at least one rail to support the carriage, means to reciprocate the carriage back and forth along the rail, a plurality of U-shaped trays forming a trough extending substantially the full length of the carriage for receiving and holding material, means pivotally mounting each U-shaped tray on the carriage on axes substantially perpendicular to the direction of movement of the carriage along the rail, and means to pivot all the trays in one direction about said axes to unload material and then pivot the U-shaped trays back into the trough forming position.

2. The distributing device of claim 1 wherein the means to pivot the trays about said axes to unload material includes means to automatically pivot all of the trays simultaneously when the carriage reaches a predetermined location.

3. The distributing device of claim 1 wherein the means to reciprocate the carriage back and forth includes a reversible motor and means to reverse the motor after the trays are pivoted about said axes to unload material.

4. The distributing device of claim 1 wherein the U-shaped trays pivotally mounted on the moveable carriage for receiving and holding material each include a bottom, two sides and two open ends.

5. The distributing device of claim 4 wherein the bottoms of adjacent trays overlap when pivoted to a material receiving and holding position.

6. The distributing device of claim 1 in combination with a means to continuously supply material to the trays mounted on the moveable carriage.

7. The distribution device of claim 1 wherein the means pivotally mounting each U-shaped tray on the carriage is located midway between the ends of each tray.